US006761057B2

(12) United States Patent
Cronin et al.

(10) Patent No.: US 6,761,057 B2
(45) Date of Patent: Jul. 13, 2004

(54) ERROR DETECTION AND FAULT ISOLATION FOR MULTI-FUNCTION AIR DATA PROBES AND SYSTEMS

(75) Inventors: Dennis J. Cronin, Apple Valley, MN (US); Thomas D. Amerson, Minneapolis, MN (US); Roger D. Foster, Burnsville, MN (US); Steve F. Alwin, St. Paul, MN (US); Mark C. Skarohlid, Brooklyn Park, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 187 days.

(21) Appl. No.: 09/952,043

(22) Filed: Sep. 13, 2001

(65) Prior Publication Data

US 2003/0050766 A1 Mar. 13, 2003

(51) Int. Cl.$^7$ .......................... G01C 25/00; G01D 18/00
(52) U.S. Cl. ........................................ 73/1.78; 702/116
(58) Field of Search .................... 73/180, 182, 1.37, 73/1.59, 1.78, 178 R, 179; 701/6; 702/82, 104, 116, 183, 193; 244/194

(56) References Cited

U.S. PATENT DOCUMENTS

| | | | |
|---|---|---|---|
| 3,318,146 A | 5/1967 | DeLeo et al. .................. 73/180 |
| 4,096,744 A | 6/1978 | DeLeo et al. .................. 73/180 |
| 4,378,696 A | 4/1983 | DeLeo et al. .................. 73/180 |
| 4,378,697 A | 4/1983 | DeLeo et al. .................. 73/182 |
| 4,644,538 A | 2/1987 | Cooper et al. .................. 371/9 |
| 5,205,169 A | * 4/1993 | Hagen .......................... 73/180 |
| 5,319,970 A | 6/1994 | Peterson et al. .............. 73/182 |
| 5,485,412 A | 1/1996 | Sarkkinen et al. ..... 364/724.05 |
| 5,616,861 A | 4/1997 | Hagen .......................... 73/180 |
| 5,819,188 A | 10/1998 | Vos ................................. 70/4 |
| 6,073,084 A | * 6/2000 | Le Tron ....................... 702/94 |

FOREIGN PATENT DOCUMENTS

| | | | |
|---|---|---|---|
| DE | 37 27 906 | 3/1989 | |
| SU | 2041136 C1 | * 8/1995 | ........... B64C/13/18 |
| SU | 2103718 C1 | * 1/1998 | ........... G05B/23/02 |

OTHER PUBLICATIONS

"BFGoodrich–Aircraft Sensors Division Air Data System with SmartProbe for Fairchiled Dornier 728JET", BFGoodrich–Rosemount Aerospace, Addendum to D9820217 Rev. B, Oct. 1998, pp. 1–10.
"SmartProbe™ Air Data System for Embraer ERJ–170 & 190", BFGoodrich–Aircraft Sensors Division, Proposal D9920133, Apr. 1999, pp. 1–65.

(List continued on next page.)

*Primary Examiner*—Marc S. Hoff
*Assistant Examiner*—Paul L Kim
(74) *Attorney, Agent, or Firm*—Westman, Champlin & Kelly, P.A.

(57) ABSTRACT

A method of detecting errors in air data sensing systems having multi-function probes being used in combinations to define probe systems includes a step (A) of, for each probe system, making a first prediction of an aircraft parameter as a function of local angles of attack at two member probes of the particular system, and making a second prediction of the aircraft parameter as a function of local pressure ratios at the two member probes of the particular system. A step (B) is performed in which, for each of the probe systems, the first and second predictions of the aircraft parameter are compared to determine whether the first and second predictions are within a predetermined threshold of each other. Then, a step (C) is performed in which, for each of the probe systems, if the first and second predictions of the aircraft parameter are not within the predetermined threshold of each other, then the particular probe system is identified as having a malfunctioning member probe.

9 Claims, 12 Drawing Sheets

OTHER PUBLICATIONS

F.W. Hagen and Dr. H. Seidel, "Deutsche Airbus Flight Test of Rosemount Smart Probe for Distributed Air Data System", IEEE Aerospace and Electronic Systems Magazine, Apr. 1994, pp. 7–14.

Bulletin 1013, "Pitot and Pitot–Static Probes", BFGoodrich (May 1998).

T.J. Rohloff, S.A. Whitmore and I. Catton, "Air Data Sensing from Surface Pressure Measurements Using a Neural Network Method", AIAA Journal, vol. 36, No. 11, Nov. 1998, pp. 2095–2101.

T.J. Rohloff, S.A. Whitmore and I. Catton, "Fault–Tolerant Neural Network Algorithm for Flush Air Data Sensing", Journal of Aircraft, vol. 36, No. 3, May–Jun. 1999, pp. 541–549.

T.J. Rohloff and I. Catton, "Fault Tolerance and Extrapolation Stability of a Neural Network Air–Data Estimator", Journal of Aircraft, vol. 36, No. 3, May–Jun. 1999, pp. 571–576.

* cited by examiner

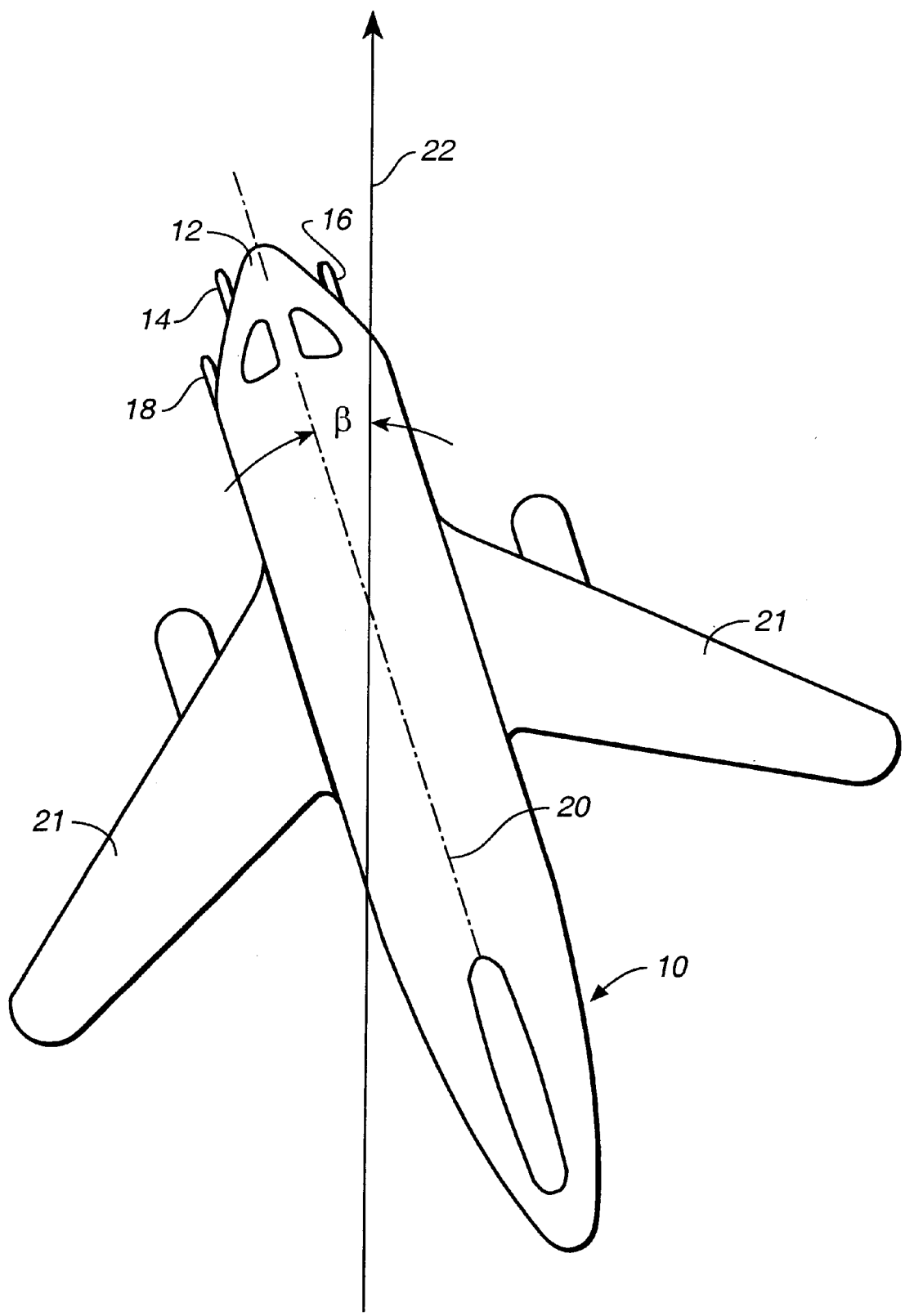
FIG. _1

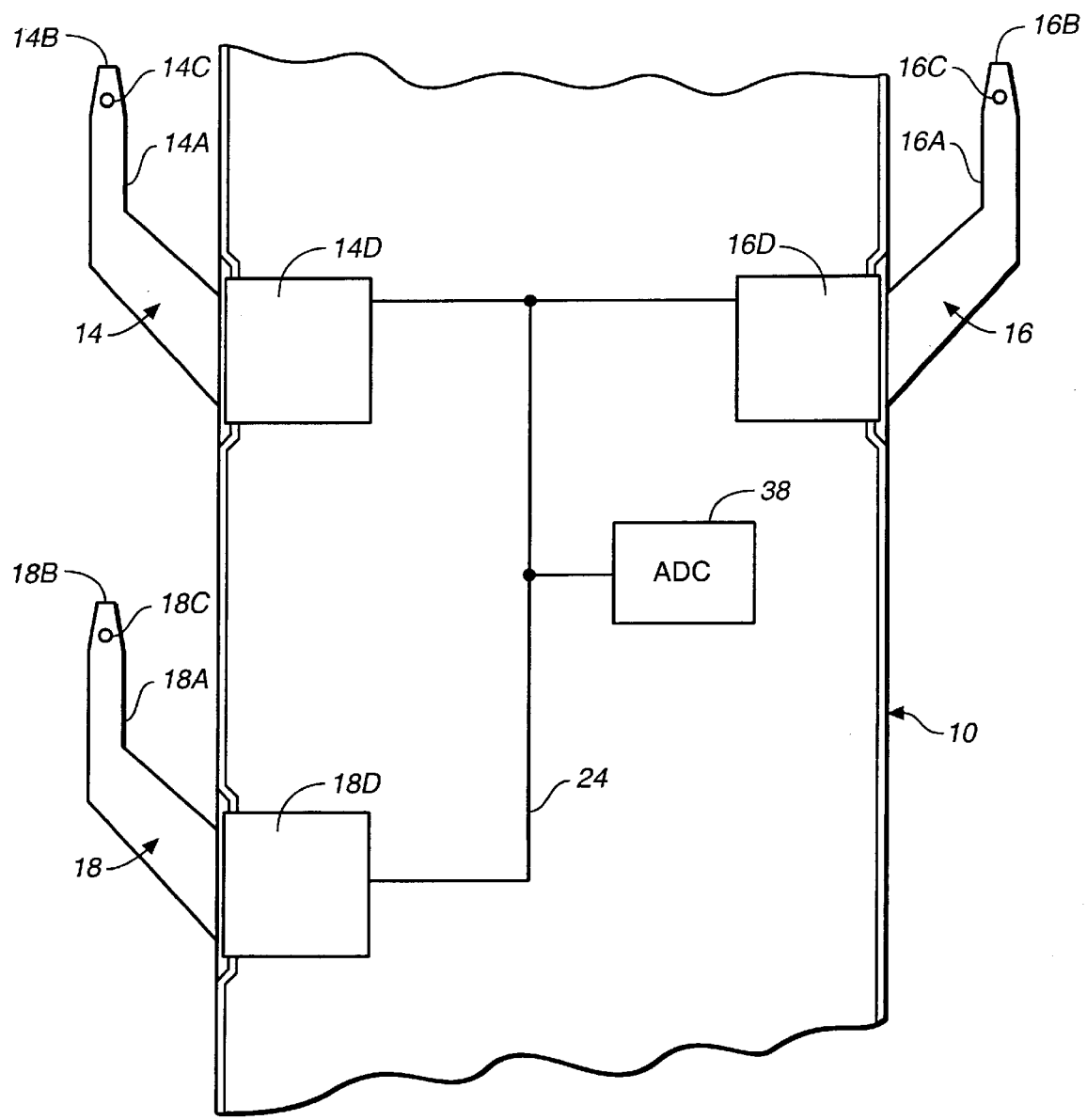
FIG._2

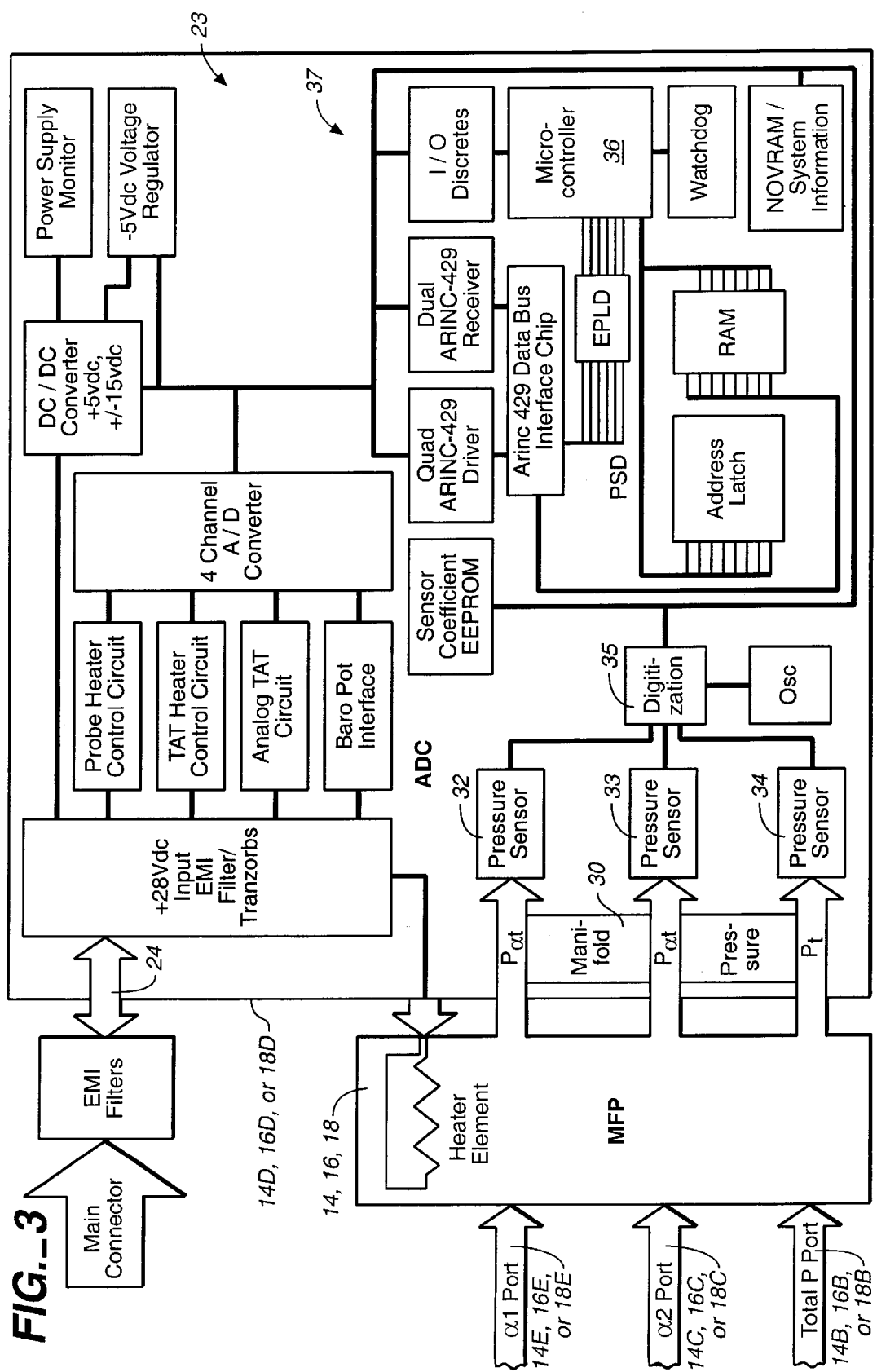
FIG._3

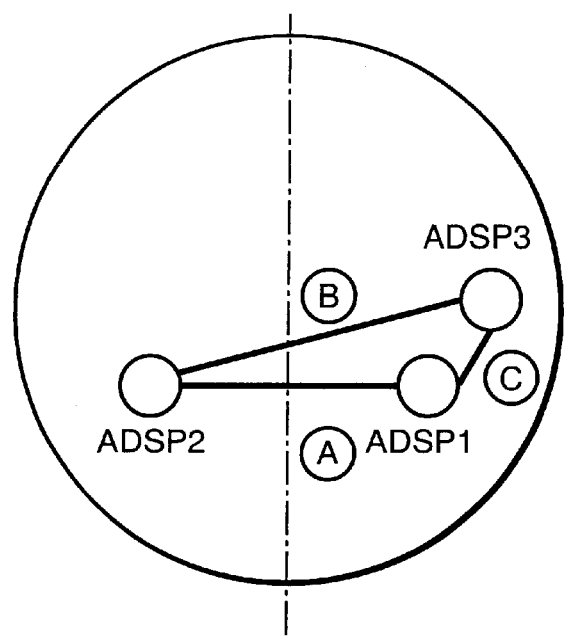
FIG._4A
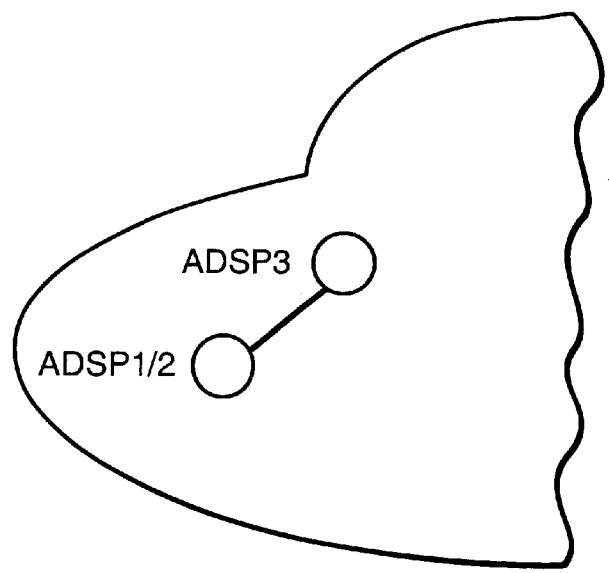
FIG._4B

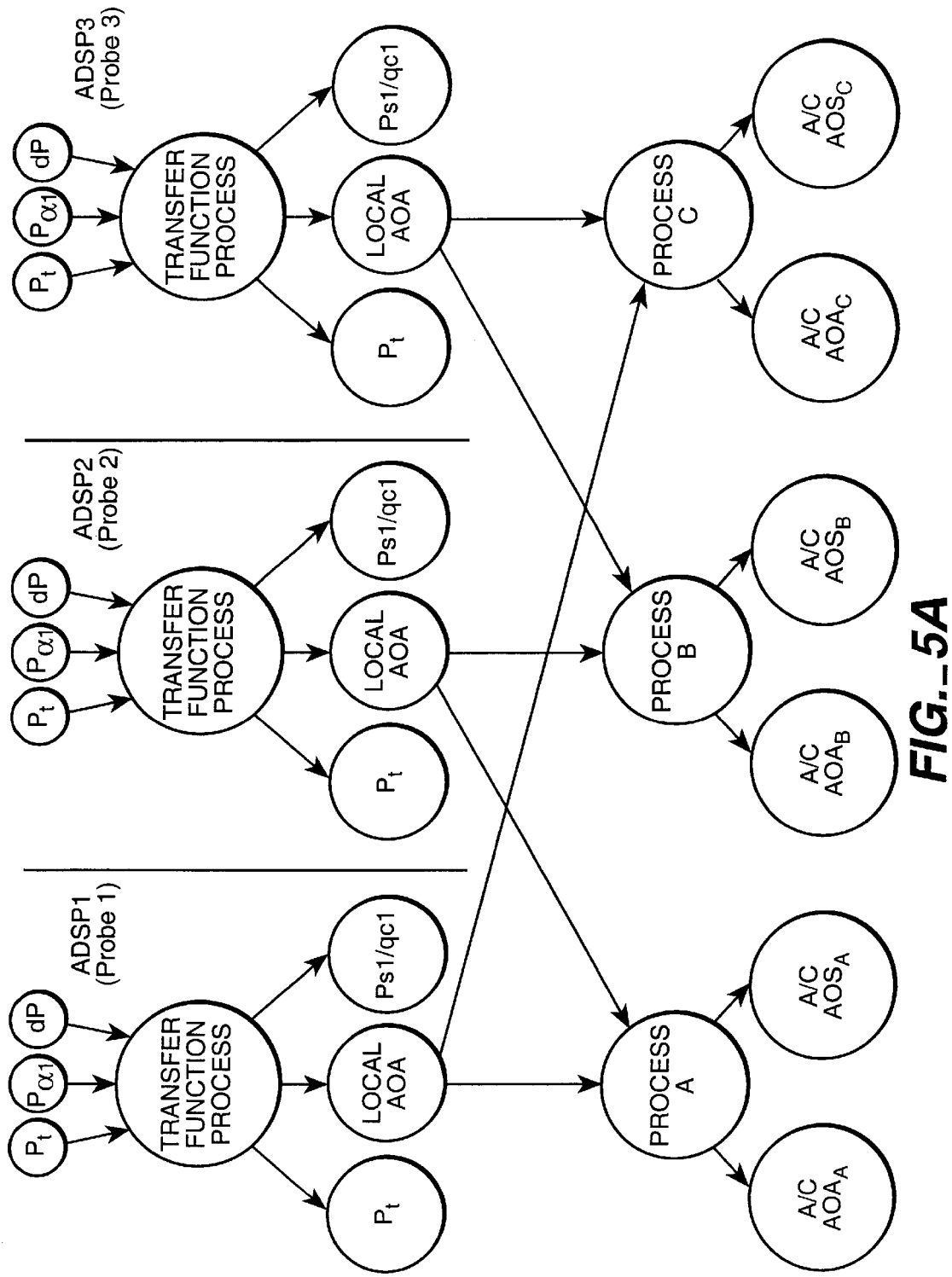
FIG._5A

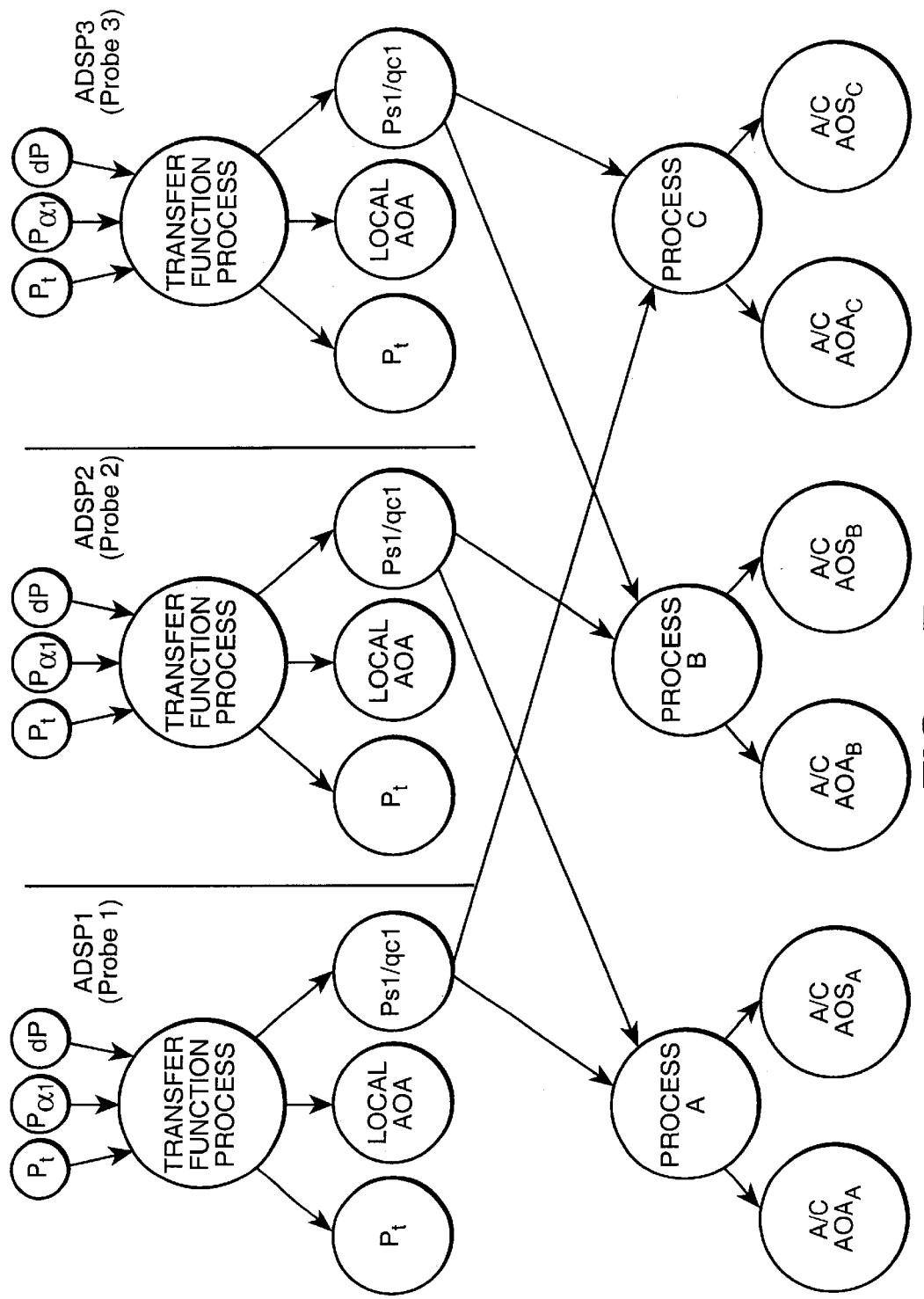
FIG._5B

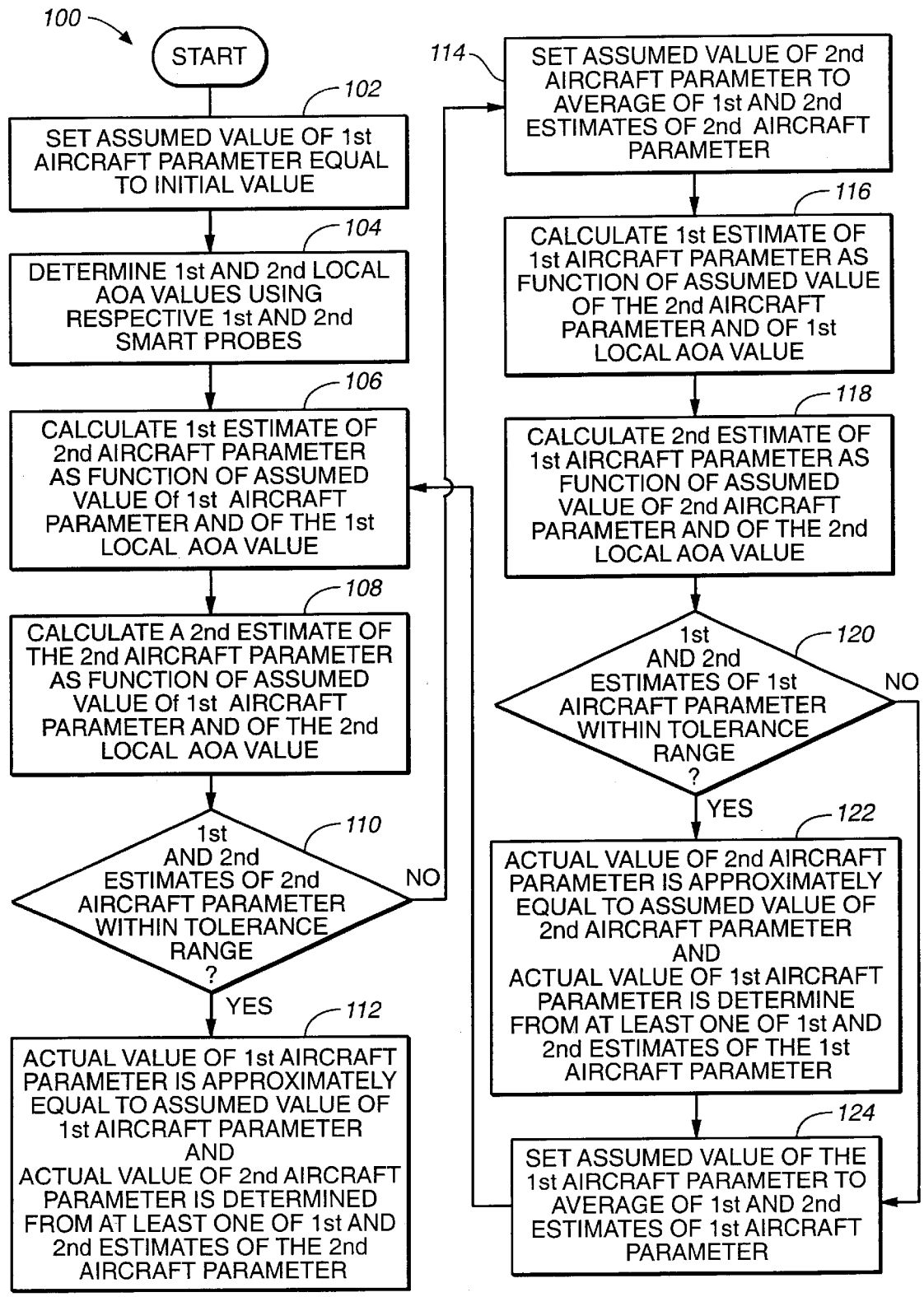
FIG._5C

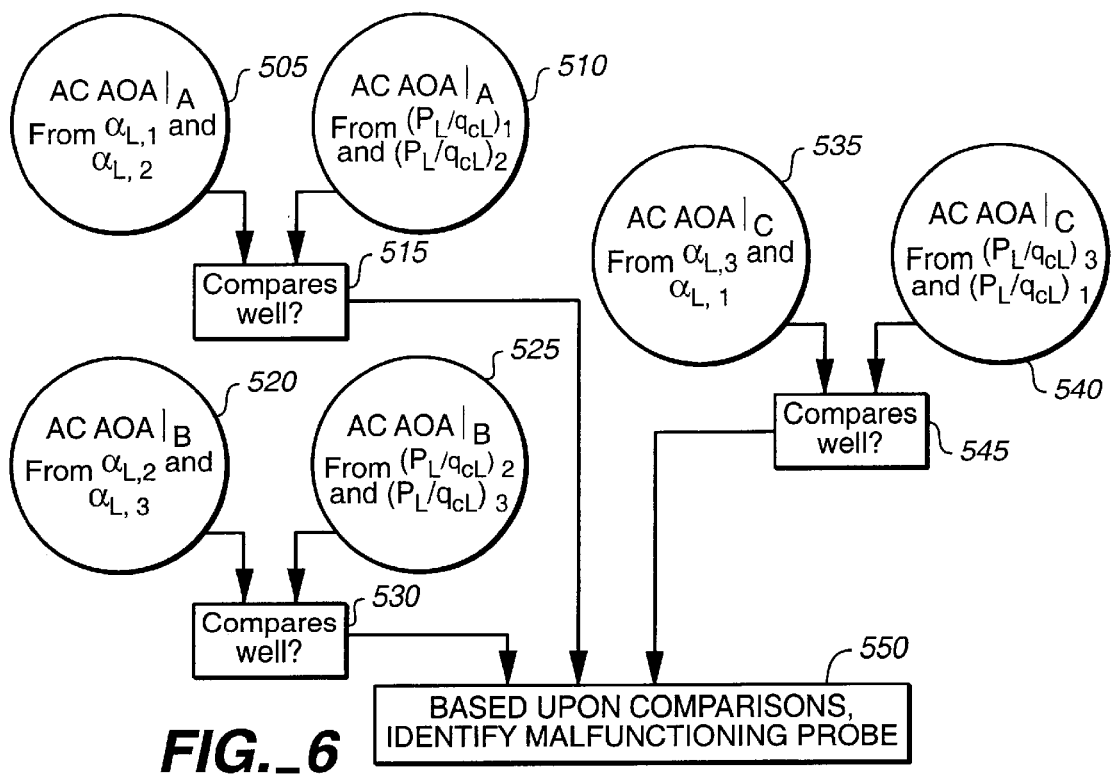

FIG._6

| FOR EACH PROBE SYSTEM, MAKE A FIRST PREDICTION OF AN AIRCRAFT PARAMETER AS A FUNCTION OF LOCAL ANGLES OF ATTACK AT THE TWO MEMBER PROBES OF THE PARTICULAR SYSTEM, AND MAKE A SECOND PREDICTION OF THE AIRCRAFT PARAMETER AS A FUNCTION OF LOCAL PRESSURE RATIOS AT THE TWO MEMBER PROBES OF THE PARTICULAR SYSTEM | 560 |

↓

| FOR EACH PROBE SYSTEM, COMPARE THE FIRST AND SECOND PREDICTIONS OF THE AIRCRAFT PARAMETER TO DETERMINE WHETHER THE FIRST AND SECOND PREDICTIONS ARE WITHIN A PREDETERMINED THRESHOLD OF EACH OTHER | 565 |

↓

| FOR EACH OF PROBE SYSTEMS, IF THE FIRST AND SECOND PREDICTIONS OF THE AIRCRAFT PARAMETER ARE NOT WITHIN A PREDETERMINED THRESHOLD OF EACH OTHER, THEN IDENTIFY THE PARTICULAR PROBE SYSTEM AS HAVING A MALFUNCTIONING MEMBER PROBE | 570 |

FIG._7

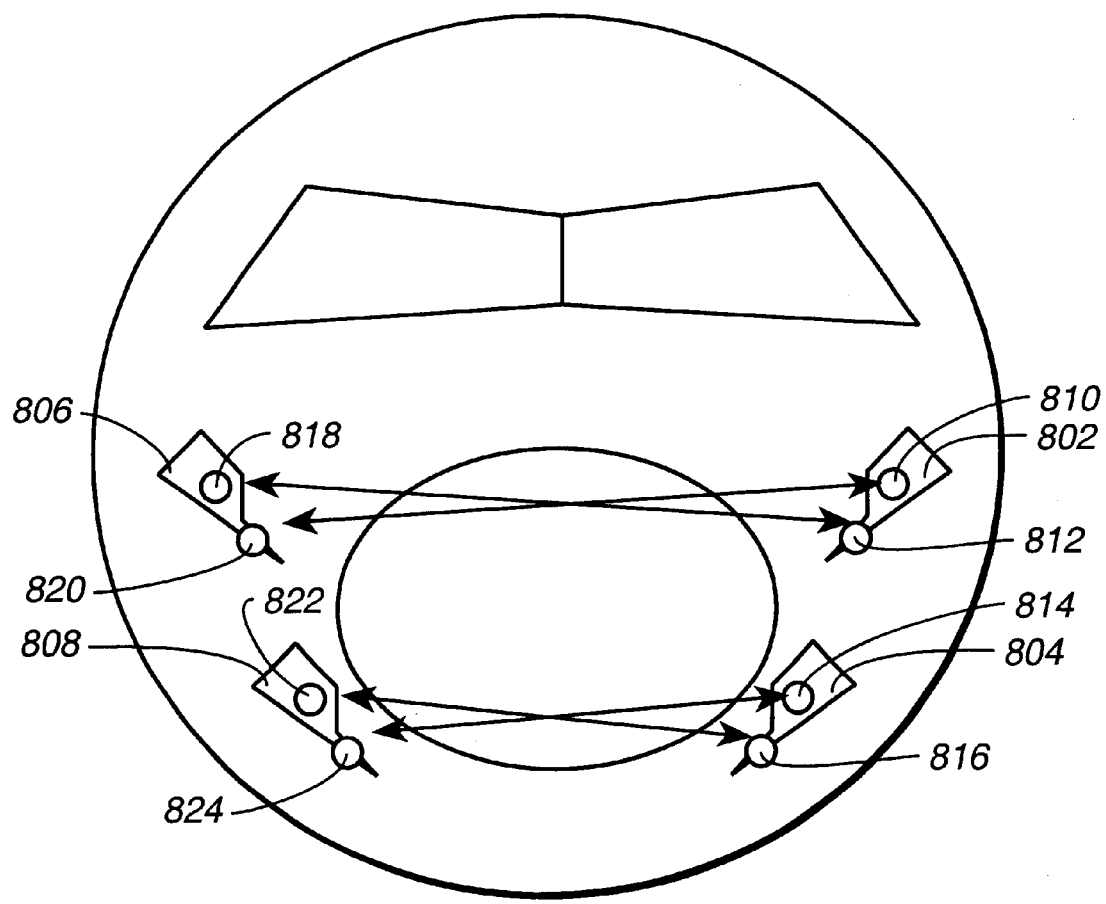
FIG._8A

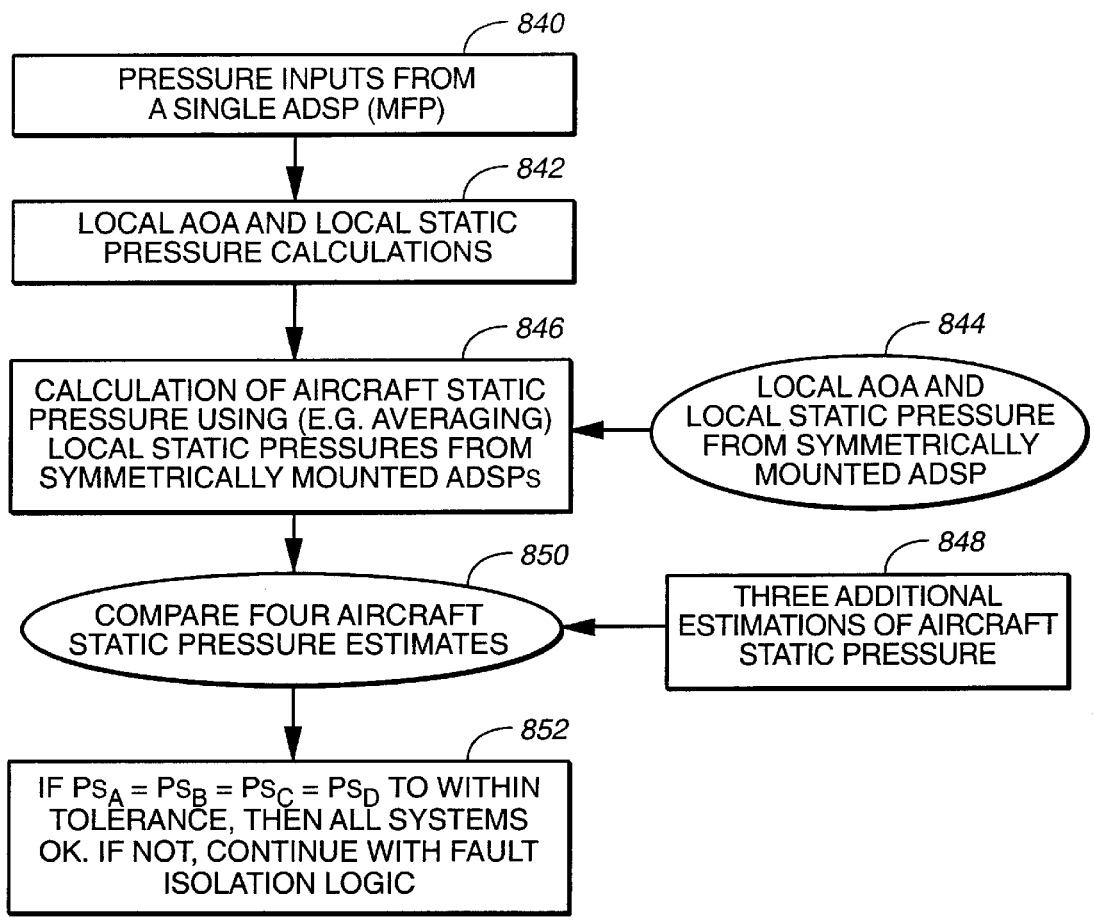
FIG._8B
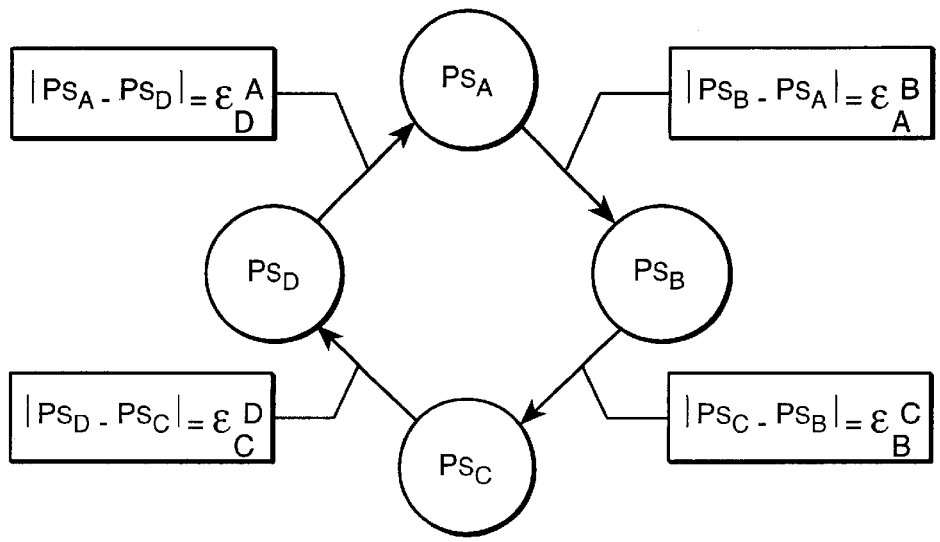
FIG._9

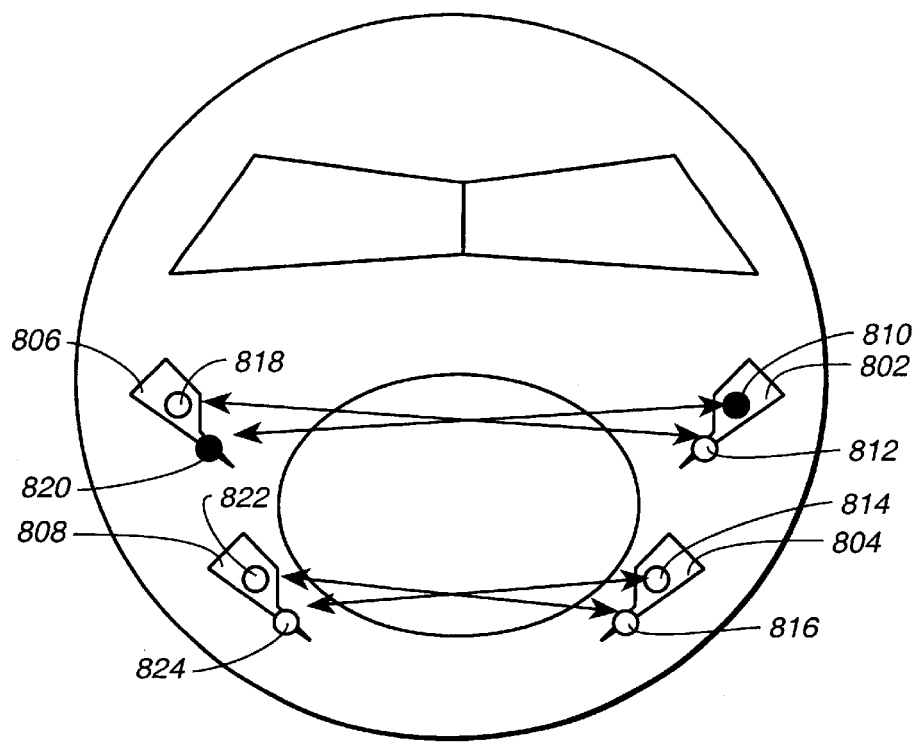
FIG._10A
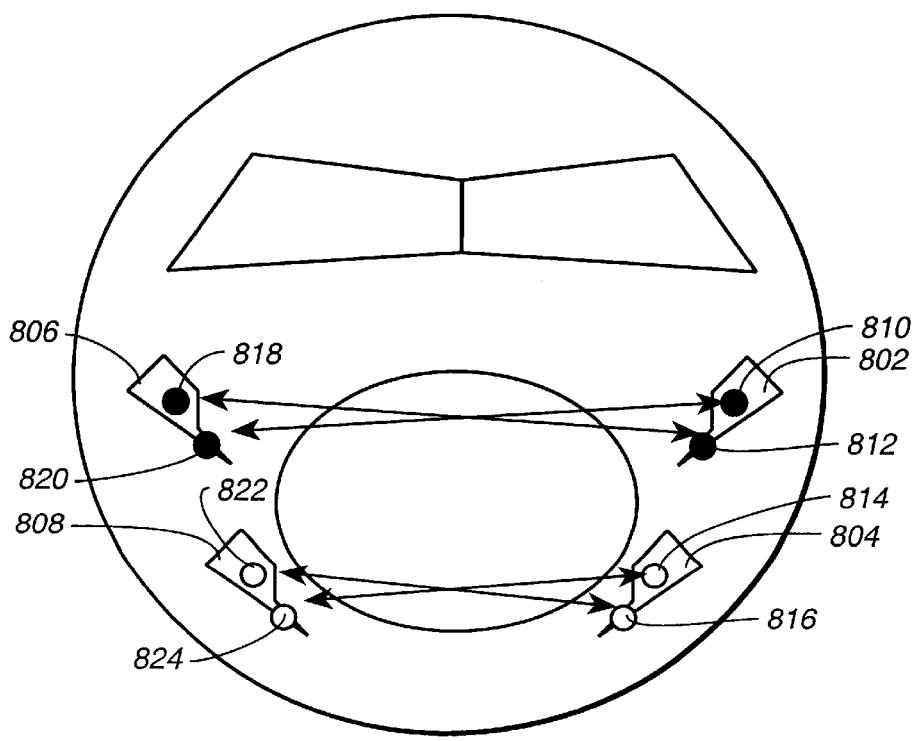
FIG._10B

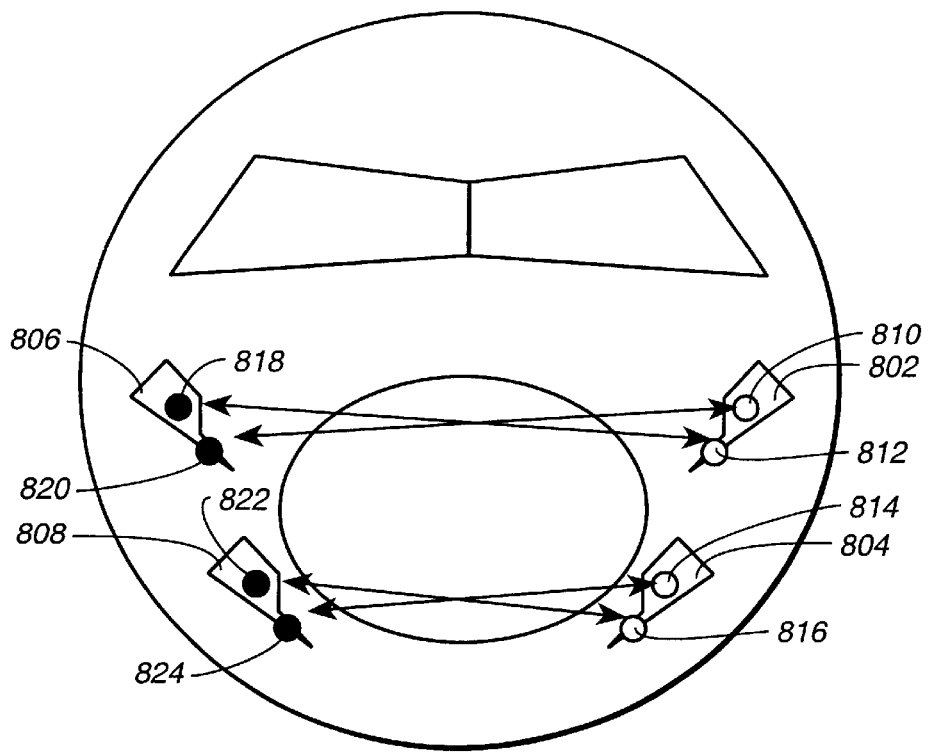
FIG._11A
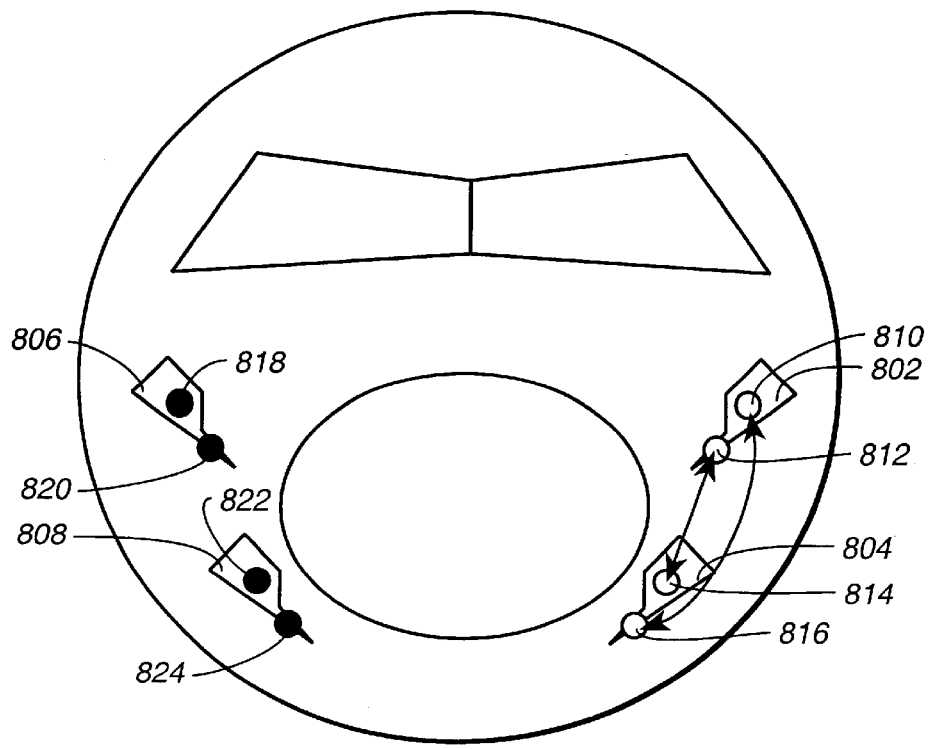
FIG._11B

ERROR DETECTION AND FAULT ISOLATION FOR MULTI-FUNCTION AIR DATA PROBES AND SYSTEMS

BACKGROUND OF THE INVENTION

The present invention relates generally to air data sensing systems for use on aircraft. More particularly, the present invention relates to methods of detecting unannunciated errors in air data sensing systems including pairs of air data sensing probes (multi-function probes or MFPs).

Air data systems that calculate the aerodynamic aircraft angle of attack (AOA) and angle of sideslip (AOS) of an air vehicle utilizing independent probes that are not pneumatically coupled, but which have processors for interchanging electrical signals between the probes, are known in the art. These probes are sometimes referred to as multi-function probes (MFPs) or air data sensing probes (ADSPs). One type of MFP is the SmartProbe sold by Goodrich Corporation. Multi-function probes include processing circuitry located at the probe itself as part of its instrument package. During sideslip of the air vehicle, compensation of various local (to the probes) parameters or signals, such as angle of attack and static pressure, is necessary for accurate determination of aircraft angle of attack and other aircraft parameters including determination of altitude from static pressure or other means. This requirement for accuracy in altitude indications is particularly important in Reduced Vertical Separation Minimum (RVSM) space areas of the air traffic control system.

In conventional air data systems, probes on opposite sides of an aircraft can be pneumatically connected so that the pressure signals are averaged between the right side of the aircraft and the left side of the aircraft to provide a static pressure that is "nearly true". In most conventional systems therefore, although corrections are made for Mach number and aircraft angle of attack, it is rare that neglecting sideslip effect will introduce enough error to warrant a correction based on sideslip for the cross coupled probes. However, MFPs are connected only electrically in order to eliminate the need for pneumatic tubing passing between the opposite sides of the aircraft or between probes on the same side of the aircraft. This means that each probe is pneumatically independent, even if it is electrically communicating with other probes.

To provide redundancy in estimations of aircraft AOA and AOS, multiple MFPs are used in an air data sensing system. The multiple MFPs can be used in pairs to define multiple probe systems each having two MFPs as members. A single MFP can be a member of several different probe systems.

It is known that estimations of local AOA at two MFPs in a probe system can be used to predict aircraft AOA and aircraft AOS. It is also know that aircraft AOA and AOS can be calculated or estimated by using the local pressure ratios Psl/qcl, where Psl is the local static pressure and qcl is the local impact pressure (the difference between the total pressure and the local static pressure, $P_T$–Psl) from each of two uniquely located probes. In other words, each two-probe system can arrive at estimations of aircraft AOA and aircraft AOS which are a unique function of the local AOA estimations at the two probes or a unique function of the pressure ratio Psl/qcl. Thus, for an air data system having three MFPs, three separate two-probe systems (i.e., systems A, B and C) can be formed, providing three estimations of the aircraft parameters AOS (i.e., $\beta_A$, $\beta_B$ and $\beta_C$) and AOA (i.e., $\alpha_A$, $\alpha_B$ and $\alpha_C$). If all three values of either of the parameters agree to within some specified tolerance, it could be determined that there is no problem with any of the probes, transducers or electronics. However, if the three values do not agree, it is possible that there exists an error in one or more of the MFPs. Since each probe system has at least two MFPs contributing to its calculations, it can be difficult to isolate the malfunctioning probe. Consequently, a method of detecting these unannunciated errors in MFP air data sensing systems would be a significant improvement in the art.

The invention is extended to cover systems of probes in which it is desired to isolate poorly performing systems or to isolate errors when only two systems are available for 'voting'.

SUMMARY OF THE INVENTION

A method of detecting errors in air data sensing systems having multi-function probes being used in combinations to define probe systems includes a step (A) of, for each probe system, making a first prediction of an aircraft parameter as a function of local angles of attack at two member probes of the particular system, and making a second prediction of the aircraft parameter as a function of local pressure ratios at the two member probes of the particular system. A step (B) is performed in which, for each of the probe systems, the first and second predictions of the aircraft parameter are compared to determine whether the first and second predictions are within a predetermined threshold of each other. Then, a step (C) is performed in which, for each of the probe systems, if the first and second predictions of the aircraft parameter are not within the predetermined threshold of each other, then the particular probe system is identified as having a malfunctioning member probe.

BRIEF DESCRIPTION OF THE DRAWINGS

FIG. 1 is a top plan view of an aircraft illustrating a sideslip condition.

FIG. 2 is a schematic representation of a cross section of a nose portion of an aircraft showing placement of air data sensing probes, called multi-function probes (MFPs), made and configured to function in accordance with the present invention in one form.

FIG. 3 is a block diagram illustrating circuitry of one or more of the MFPs, with the circuitry including an air data computer in some embodiments of the invention.

FIGS. 4A and 4B are diagrammatic illustrations of a nose portion of an aircraft showing three separate two-probe systems formed from three MFPs.

FIGS. 5A and 5B are flow or process diagrams illustrating techniques of generating and comparing aircraft parameters from different two-probe systems in accordance with embodiments of the invention.

FIG. 5C is a flow or process diagram by which aircraft level aerodynamic parameters can be estimated iteratively when two local variables are known.

FIG. 6 is a flow or process diagram illustrating a method of the present invention of identifying which of multiple MFPs is malfunctioning if the comparison processes shown in FIG. 5A or 5B indicate that a malfunction in one of the systems is likely.

FIG. 7 is a block diagram illustrating a method of the present invention corresponding to the process diagram shown in FIGS. 5A, 5B, 5C, and 6.

FIG. 8A is a diagrammatic front view of a nose portion of the aircraft showing four two-probe systems formed with four MFPs.

FIG. 8B is a flow diagram illustrating a method of comparing aircraft static pressure estimates in accordance with the invention.

FIG. 9 is a process diagram illustrating a method of comparing aircraft parameters from multiple two-probe systems in accordance with the invention.

FIGS. 10A and 10B are diagrammatic front views of a nose portion of an aircraft illustrating conditions in which one and two probe systems are malfunctioning, respectively.

FIGS. 11A and 11B are front view diagrammatic illustrations of a nose portion of an aircraft illustrating conditions in which two MFPs on the same side of an aircraft are malfunctioning.

DETAILED DESCRIPTION OF AN ILLUSTRATIVE EMBODIMENT

Referring to FIG. 1, an aircraft indicated generally at 10 is shown with a nose portion 12. Mounted air data sensing probes (ADSPs) or multi-function probes (MFPs) are indicated schematically and generally at 14, 16 and 18 to form a three-probe air data sensing system. As discussed below, combination of the MFPs can be used to define multiple two-probe systems. The number of independent systems depends on the number of sources of local static pressure, and local angle of attack (AOA) that can be combined to give a unique representation of aircraft level values of AOA and angle of sideslip (AOS). The positioning of aircraft 10 is with respect to a center plane or center line 20 that is perpendicular to the normal plane of the wings 21. Center line 20 is shown in a greatly exaggerated sideslip condition where the path of travel of aircraft 10 is indicated at 22, and where there is a substantial angle β between the path of travel line 22 and the line or plane 20. Angle β is the aircraft angle of sideslip (AOS), which is defined herein as an aircraft parameter. The aircraft essentially is yawing to the left in FIG. 1. As the airflow passes across the aircraft, the probes 14 and 18 will be subjected to different flow conditions, insofar as the angle of wind and local static pressure is concerned, than is the probe 16 and most likely different from each other.

Another aircraft parameter is aircraft angle of attack (AOA). It also can also be envisioned that if the aircraft changes angle of attack, because of the yaw angle, the amount of change in pressure on one side of the aircraft would be different than that on the other side of the aircraft. When the probes are only electrically connected together, it may be difficult to simply average these changes to obtain a sideslip-corrected static pressure reading. The angle of sideslip value can eventually be used as a correction factor to compensate for this angle in a systematic manner.

A multi-function probe or MFP is defined as a probe in which a computer is integrally attached as a processor to the probe, and the sensing portions of the probe itself protrude in the airstream that moves past the aircraft skin. The processor is an integrated housing immediately inside the skin. The outputs from MFPs are digital electrical signals representing pressures derived from sampling the pressure readings from internal pressure sensors. The internal pressure sensors of an MFP can be either differential sensors or absolute sensors that receive the pressure signals and convert them into electrical signals that are then digitized. In some embodiments of the invention, the methods disclosed herein are implemented within an air data computer (ADC) embodied in the processing circuitry integral to the MFP housing, or within multiple ADCs located within multiple MFPs. In yet other embodiments, the methods are implemented within an ADC which is coupled to, but located remote from, the MFP.

The probes 14, 16 and 18 may be probes such as that shown in the U.S. Pat. No. 4,378,696, or other similar patents. As shown schematically in FIG. 2, the probes have barrels 14A, 16A and 18A, with suitable ports for sensing total pressure at leading ends of the probes indicated at 14B, 16B and 18B. The angle of attack sensing ports are placed on the top and bottom of the probes, and the top ports are illustrated schematically at 14C, 16C and 18C. Mating ports are on the lower portion, as is well known, for measuring the angle of attack by sensing the differentials in pressure between the upper port and the lower port. The lower port on the probes will sense a pressure designated $P\alpha_1$, and the upper ports shown at 14C, 16C and 18C sense a pressure designated $P\alpha_2$. Each of the probes 14, 16 and 18 is provided with separate instrument housing 14D, 16D and 18D, respectively. While MFPs 14, 16 and 18 are shown in FIGS. 1 and 2, the present invention can, in some embodiments, only include two MFPs such as probes 14 and 16 or other combinations such as probes 16 and 18.

As shown in FIG. 2, the electronics within instrument housings 14D, 16D and 18D are electrically coupled via electrical connection 24. Electrical connection 24 can be a data bus, electrical cables, or other types of communication pathways for communicating information. Also shown in FIG. 2 is an optional remote ADC 38 within which the methods of the present invention can be implemented. However, in embodiments of the invention, the methods disclosed herein are implemented within one or more ADCs contained within the housings 14D, 16D and/or 18D associated with the MFPs. In these embodiments, optional ADC 38 can be omitted if desired.

The arrangement of the circuitry in one example embodiment of an MFP is shown in block diagram form in FIG. 3. Multi-function probe circuitry 23 is shown schematically coupled to a probe (14, 16 or 18) which is labeled as a multi-function probe (MFP). Circuitry 23 is positioned within the corresponding housing 14D, 16D and 18D, and in the illustrated embodiment comprises an air data computer (ADC). Inputs are illustrated schematically as the $\alpha_1$ pressure port 14E, 16E or 18E, $\alpha_2$ pressure port 14C, 16C or 18C, and the total pressure port 14B, 16B or 18B. The $\alpha_2$ pressure port and total pressure port correspond to those shown in FIG. 2 for probes 14, 16 and 18. The $P_{\alpha 1}$ pressure port corresponds to the lower port (not shown in FIG. 2) on the probes.

These pressures are transmitted through a manifold 30 to individual pressure sensors 32, 33 and 34, respectively. The outputs of pressure sensors 32, 33 and 34 are provided to analog-to-digital converter 35 for digitization. Processing and communications circuitry 37 includes a microcontroller 36 and related memory and communications circuits all forming part of the ADC (i.e., circuitry 23). The ADC can also include other circuits and devices such as electromagnetic filters for reducing EMI interference, heater control circuits, and power supplies. Air data computer or circuitry 23 also includes and/or is coupled to data bus 24 for receiving information from, or transmitting information to, other MFPs in the system. The methods of the present invention can be implemented within the air data computers of one or more MFPs, or can be implemented in a separate and remotely positioned air data computer. Also, in other embodiments, each MFP may include additional pressure ports, providing redundant measurements of the pressures described above. The circuitry shown in FIG. 3 can be modified to accommodate the additional pressure measurements to make additional or redundant local or aircraft parameter calculations.

FIGS. 4A and 4B are diagrammatic front and side views, respectively, of the nose section of an aircraft. Also shown in FIGS. 4A and 4B is an air data sensing system having a first multi-function probe (ADSP1), a second multi-function probe (ADSP2) and a third multi-function probe (ADSP3). The first and second multi-function probes may be mounted symmetrically on right and left sides of the aircraft. The third multi-function probe may be mounted on the same side of the aircraft as the first multi-function probe. Other embodiments of a three-probe air data system can be found in co-pending and commonly assigned U.S. patent application Ser. No. 09/851,485 filed on May 8, 2001 and entitled ITERATIVE METHOD OF AIRCRAFT SIDESLIP COMPENSATION FOR MULTI-FUNCTION PROBE AIR DATA SYSTEMS; U.S. patent application Ser. No. 09/850,863 filed on May 8, 2001 and entitled METHOD TO CALCULATE SIDESLIP ANGLE AND CORRECT STATIC PRESSURE FOR SIDESLIP EFFECTS USING INERTIAL INFORMATION, and U.S. patent application Ser. No. 09/851,289 filed on May 8, 2001 and entitled MULTI-FUNCTION AIR DATA PROBES USING NEURAL NETWORK FOR SIDESLIP COMPENSATION, all of which are incorporated by reference in their entirety.

As shown in FIG. 4A, three two-probe systems can be defined using the three multi-function probes. The first system (system "A") has multi-function probes ADSP1 and ADSP2 as members. The second two-probe system (system "B") includes as members multi-function probes ADSP2 and ADSP3. The third two-probe system (system "C") includes multi-function probes ADSP1 and ADSP3 as members.

Using each of the three two-probe systems, three separate estimations of aircraft parameters (i.e., aircraft AOA and/or aircraft AOS) can be calculated, with each estimate of the aircraft parameters being based upon combinations of two local pressure ratios or two local AOAs at the system's member probes. If one of the MFPs is malfunctioning or experiencing an error, the three predictions of aircraft parameters may not agree. However, determining which of the MFPs is producing the error is not readily apparent.

In some embodiments, to diagnose which of the three MFPs is producing the error, a review of the expected local Psl/qcl (local static pressure divided by local impact pressure) at the three MFP locations can be conducted. As an example, assume that the first MFP (ADSP1) is damaged in some way. Because of the incorrect readings at probe 1, it has influenced the values that system A and system C predict if the local AOA at ADSP1 and ADSP2 are used for system A and the local AOA at ADSP1 is used in conjunction with the local AOA at ADSP3 for system C. If one were to use the aircraft AOA and aircraft AOS from system A to check the local static pressure at the second probe (ADSP2), this prediction would be found to be in error. Similarly, the prediction of local static pressure at the third MFP (ADSP3) using aircraft AOA and aircraft AOS from system C would be in conflict. It may also be that because of how the error in the first MFP has affected both the local AOA estimation and the local static pressure at the first probe, the local static pressure prediction using erroneous aircraft parameters from systems A and C would give no contradiction in what is being measured at probe 1.

Moving through the permutations, if the second and third MFPs are fine, system B will not only predict the correct aircraft parameters using local AOA as the look-up values, but the predicted local static pressure at those points would be correct as well for the predicted aircraft AOA and AOS.

FIGS. 5A and 5B are illustrations of alternative processes for implementing preliminary steps to determine whether one of the two-probe system estimations of aircraft parameters is in error. If one of the two-probe systems is shown to be producing erroneous estimations of aircraft parameters, the process illustrated in FIG. 6 can be used to identify which of the MFPs is malfunctioning. FIG. 6 is discussed in greater detail following the discussion of FIGS. 5A and 5B. A gross fault detection can used by comparing the three indications of freestream static pressure from each of the three systems.

FIG. 5A illustrates, for a first embodiment, steps of a first method of determining whether a malfunctioning MFP is causing aircraft parameters predictions to be in error. The method illustrated in FIG. 5A can be implemented within the ADC of one or more of the MFPs. As shown in FIG. 5A, each of the first, second and third MFPs uses as inputs to a transfer function process on its local total pressure $P_t$, at least one of the local AOA indicative pressures ($P_{\alpha}^1$ is illustrated), and a local differential pressure dP (where dP is $P_{\alpha}^1 - P_{\alpha}^2$). Using the transfer function processes, look-up tables or other methods of the type known in the art, each of the three MFPs illustrated in FIG. 5A will generate a local total pressure $P_t$, a local AOA and a local pressure ratio Psl/qcl (where Psl is the local static pressure for the probe and qcl is the local impact pressure for the probe) corrected for systematic effects.

In this embodiment, each of the three systems shown in FIG. 4 uses the local AOA calculation from each of its member probes to calculate or estimate aircraft parameters of AOA and AOS. As shown in FIG. 5A, system A (shown as "PROCESS A") uses local AOA information from the first and second MFPs to generate aircraft angle of attack estimate $AOA_A$ and aircraft angle of sideslip estimate $AOS_A$. The process used by system A to generate the aircraft parameters can be any of wide variety. For example, the process used by system A can be an iterative process, a transfer function developed using computational fluid dynamics (CFD) data, a trained neural network, or a look-up table.

Systems B and C utilize local AOA data from their respective member probes to calculate aircraft parameters. As shown, system B generates aircraft angle of attack parameter $AOA_B$ and aircraft angle of sideslip parameter $AOS_B$, while system C generates aircraft angle of attack parameter $AOA_C$ and aircraft angle of sideslip parameter $AOS_C$. The processes used by systems B and C to calculate the aircraft parameters will generally the same as the process used by system A.

FIG. 5C is a flow diagram illustrating iterative methods of determining aircraft flight data parameters using data from first and second MFPs. In the following discussion, aircraft parameters such as aircraft angle of sideslip and aircraft angle of attack are defined as the angle of sideslip and angle of attack, respectively, for the aircraft itself. For example, FIG. 1 illustrates aircraft angle of sideslip β. A local angle of attack, on the other hand, is defined as the angle of attack as measured or perceived by an individual MFP based upon pressures sensed using that MFP. The local angle of attack can also be defined as the compensated angle of attack measured by an individual MFP, and compensated by that MFP for a local sideslip value also measured at that probe. The local angle of attack values can also be defined to include values compensated in other manners.

The iterative methods, shown by way of the example embodiment of FIG. 5A, are discussed with reference to this one particular embodiment, but can be applied to the other embodiments and steps as well. Generally, the iterative method discussed below utilize three independent variables to iteratively determine the value of a fourth variable or parameter. For example, aircraft angle of attack can be iteratively determined using as the three independent variables local angles of attack from first and second MFPs and an aircraft angle of sideslip value. The first aircraft parameter (in this example aircraft AOS), used as an independent variable to iteratively determine the second aircraft parameter, can be an assumed value which is itself adjusted during the process. The iterative method can also use as the three independent variables local pressure ratios Psl/qcl from first and second MFPs and an aircraft angle of sideslip value to determine the aircraft angle of attack. In each of these two examples, aircraft angle of sideslip can be determined by substituting aircraft angle of attack as the third independent variable (along with the local angles of attack or the local pressure ratios). The iterative method can be used with other combinations of independent variables as well.

Referring again to FIG. 5C, using values of local angle of attack, for example, provided by two separate MFPs, there exists some unique combination of probe angles that correspond to aircraft variables of angle of attack and angle of sideslip. The illustrated predictor-corrector method can be used to iterate on aircraft parameters based on assumed freestream variables. As mentioned above, the assumed freestream variables can be an assumed value of a first aircraft parameter such as aircraft angle of attack or aircraft angle of sideslip.

As shown in step 102 in flow diagram 100 of FIG. 5C, the iterative method begins by setting or defining an assumed value of a first aircraft parameter to be equal to an initial value. For purposes of providing an example, it is assumed in the following discussion that the first aircraft parameter is an aircraft angle of sideslip. However, the first aircraft parameter can also be, for example, an aircraft angle of attack. In the present example where the first aircraft parameter is an aircraft angle of sideslip, the assumed value of the aircraft angle of sideslip is defined to be equal to an initial value. The initial value can be, for example, zero or a last previously known actual value of the aircraft angle of sideslip.

Next, at step 104, first and second local angle of attack values are determined, using respectively the first and second MFPs in the system. Next, as illustrated in step 106 and 108, first and second estimates of a second aircraft parameter (aircraft angle of attack in the present example) are calculated. The first estimate of the second aircraft parameter is calculated as a function of the assumed value of the first aircraft parameter and of the first local angle of attack value. Likewise, the second estimate of the second aircraft parameter is calculated as a function of the assumed value of the first aircraft parameter and of the second local angle of attack value. In general, the relationship between the local angle of attack and a single aircraft parameter, such as an assumed aircraft angle of sideslip, will uniquely determine the other aircraft level parameter for a local angle of attack measured at a single location. Methods of estimating aircraft angle of attack for a particular local angle of attack and a particular aircraft angle of sideslip are known in the art.

At step 110 illustrated in FIG. 5C, the first and second estimates of the second aircraft parameter are compared to determine whether they are within a predetermined tolerance range of each other. If the first and second estimates of the second aircraft parameter are determined to be within the predetermined tolerance range of each other, then the actual value of the first aircraft parameter is determined to be approximately equal to its assumed value, and the actual value of the second aircraft parameter is determined from at least one of the first and second estimates of this second aircraft parameter. This is illustrated in FIG. 4 at step 112. Determining the actual value of the second aircraft parameter from at least one of the first and second estimates of the second aircraft parameter can be accomplished using any desired method since the estimates are reasonably close to one another. For example, the actual value of the second aircraft parameter can be determined as an average of the first and second estimates of the second aircraft parameter, or by selecting one of the first and second estimates of the second aircraft parameter.

If it is determined that the first and second estimates of the second aircraft parameter are not within the predetermined tolerance range of each other, then the method continues at step 114. At step 114, an assumed value of the second aircraft parameter (aircraft angle of attack in this example) is defined to be an average of the first and second estimates of this second aircraft parameter (determined in steps 106 and 108 discussed above). In steps 116 and 118, first and second estimates of the first aircraft parameter (aircraft angle of sideslip in the example) are calculated. In step 116, the first estimate of the first aircraft parameter is calculated as a function of the newly assumed value of the second aircraft parameter and of the first local angle of attack value determined at step 104 as discussed above. In step 118, the second estimate of the first aircraft parameter is calculated as a function of the newly assumed value of the second aircraft parameter and of the second local angle of attack value also determined at step 104.

At step 120 illustrated in FIG. 5C, the first and second estimates of the first aircraft parameter are compared to determine whether they are within a predetermined tolerance range of each other. As shown at step 122, if the first and second estimates of the first aircraft parameter are determined to be within the predetermined tolerance range of each other, then the actual value of the second aircraft parameter is determined to be approximately equal to the assumed value of the second aircraft parameter. The actual value of the first aircraft parameter is then determined from at least one of the first and second estimates of the first aircraft parameter. Similar to the case in step 112 discussed above, in step 122 the actual value of the first aircraft parameter can be determined from an average of the first and second estimates of the first aircraft parameter, or by selecting one of the first and second estimates of the first aircraft parameter, for example. As illustrated at step 124 in FIG. 5C, if the first and second estimates of the first aircraft parameter are determined to not be within the predetermined tolerance range of each other, then the assumed value of the first aircraft parameter is changed from its initial value (and most recent value in subsequent iterations) (defined in step 102) to an average of the first and second estimates of the first aircraft parameter (identified in steps 116 and 118). At this point, the method returns to steps 106 and 108 and the first and second estimates of the second aircraft parameter are again calculated, this time using the new assumed value of the first aircraft parameter. The method iterates until the first and second estimates of the first aircraft parameter, or the first and second estimates of the second aircraft parameter, are within a tolerance range of each other.

The method described above generically with reference to first and second aircraft parameters can be described more specifically with reference to this example in which the first aircraft parameter is an aircraft angle of sideslip and the second aircraft parameter is an aircraft angle of attack. Knowing the local angle of attack at a single MFP, a prediction is made for the aircraft angle of attack based on an assumed value of the aircraft angle of sideslip. This is repeated for a second probe measurement of the local angle of attack. A comparison is made between the two predicted values of the aircraft angle of attack. If they differ within a tolerance, it is deduced that the assumed aircraft angle of sideslip is correct, and that the first and second estimates of the aircraft angle of attack are accurate. The aircraft angle of attack is then determined from at least one of the first and second aircraft angle of attack estimates. If the difference between the aircraft angle of attack estimates is not within the tolerance, it is assumed that the aircraft angle of attack is actually equal to the average of the two predictions. Using this new aircraft angle of attack assumption, aircraft angle of sideslip predictions are then made, each as a function of the assumed value of the aircraft angle of attack and a different one of the local angles of attack measured at the two MFPs. A comparison is made between the two predicted aircraft angles of sideslip to determine whether they are within a predetermined tolerance range, and if necessary the method continuous iteratively in this manner.

Again, the specific iterative method embodiment illustrated in FIG. 5C is provided as an example only. One of skill in the art will recognize that the iterative method can be modified accordingly to determine aircraft parameters such as AOA and AOS using three independent variables such as local angles of attack or local static pressure ratios in combination with an assumed value of an aircraft parameter. It may be that the third independent parameter is aircraft Mach number and the first two independent variables are the local pressure ratios Psl/qcl at the member probe locations. In this case, it may be necessary to perform two separate exercises. The first involves determining aircraft AOA as a function of the two local pressure ratios and iterating with aircraft Mach number to converge on aircraft AOA and aircraft Mach number. The second involves using the two local pressure ratios and iterating with to converge on aircraft Mach number and aircraft AOS. In either case, the combination of aircraft AOA and aircraft AOS can be found for use as shown in FIGS. 5A, 5B and 6. Thus, in FIG. 5A or FIG. 5B, processes A, B and C can be iterative processes used to provide estimations of the aircraft angle of sideslip and the aircraft angle of attack for each system or other methodology known in the art.

Referring for the moment to FIG. 5B, an alternate iterative process for generating the three estimations of aircraft parameters is illustrated. The process shown in FIG. 5B only differs from the process shown in FIG. 5A in that, for each system, the aircraft parameters AOA and AOS are estimated using the local pressure ratios Psl/qcl from each of the members probes as independent variables instead of using the local AOA at the member probes.

In the embodiments illustrated in FIGS. 5A and 5B, three separate estimations of aircraft AOA, three separate estimations of aircraft AOS, or both, are determined using the three systems shown in this example. Before proceeding further, static pressure is calculated for each of the three systems, and the three static pressure estimates are compared. The comparison can be via a voting technique where the differences between the various combinations of static pressure are determined and compared. One comparison method is discussed in greater detail below with reference FIG. 9. If the static pressure estimates in each of the three systems compare favorably (for example by being within a predetermined threshold of each other), then all three systems are assumed to be operating correctly and the next set of local pressure measurements are used to repeat the processes shown in FIGS. 5A and 5B. However, if the static pressure estimates differ by too great a margin, one or more of the systems is likely to be malfunctioning.

FIG. 6 is an illustration of a method of identifying a malfunctioning or poorly performing probe after a comparison of aircraft static pressure for the three systems demonstrates that at least one of the systems is malfunctioning. In accordance with embodiments of the present invention, for each system, two separate predictions of an aircraft parameter (i.e., aircraft AOA or AOS) are made for each system. The first is an aircraft parameter prediction using the two local AOAs from the two member probes of the system as shown in FIG. 5A, while the second is an aircraft parameter prediction using the two local pressure ratios Psl/qcl from the same two member probes of the system in combination with a process that determines aircraft Mach number as a by-product if necessary. For each system, the two aircraft parameter (AOS or AOA) predictions are compared to determine whether they are within a predetermined tolerance of each other. If both probes of a system are functioning well, the aircraft parameter predictions will match for that system. If they do not match, then one of the probes in that system is off. If each probe is a member of two different systems, then a malfunctioning probe will cause the comparison in each of the two systems of which it is a member to not be within tolerance. The probe common to the two systems that are off can be identified as poorly performing.

Referring more specifically to FIG. 6, an example of this method of isolating or detecting malfunctioning probes is provided. As shown at 505, aircraft $AOA_A$ for system A is predicted from the local AOAs at the first and second probes. This is process A in FIG. 5A. At 510, aircraft $AOA_A$ for system A is also predicted from the local pressure ratios Psl/qcl ($P_L/q_{cL}$ in FIG. 6) at the first and second probes. This is process A in FIG. 5B. At 515, it is determined whether these two aircraft AOA predictions for system A compare well (for example, are within a predetermined tolerance of each other).

This process is repeated for system B at steps 520, 525 and 530 using local AOAs and pressure ratios Psl/qcl from the second and third probes. Likewise, this process is repeated for system C at steps 535, 540 and 545 using local AOAs and pressure ratios from the first and third probes. If both probes of a system are functioning well, the aircraft AOA predictions will match for that system. If they do not match, then one of the probes in that system is off. At 550 in FIG. 6, the malfunctioning probe is identified based upon the comparisons in steps 515, 530 and 545. In this step, the probe common to the two systems that are off can be identified as poorly performing.

Referring now to FIG. 7, shown is a flow diagram which summarizes a method of detecting errors in air data sensing systems having multiple MFPs, and with the multiple MFPs being used in combinations to define multiple probe systems each having at least two MFPs as members. As shown at step 560, for each of the probe systems, a first prediction of an aircraft parameter is made as a function of local angles of attack at the member probes of the particular system. Then, a second prediction of the aircraft parameter is made as a function of local pressure ratios at the member probes of the particular system. The aircraft parameter of which the first and second predictions are made can be, for example, either an aircraft angle of attack or an aircraft angle of sideslip. Next, as illustrated at step 565, for each of the probe systems, the first and second predictions of the aircraft parameter are compared to determine whether the first and second predictions are within a predetermined threshold of each other. Finally, at step 570, for each of the probe systems, if the first and second predictions of the aircraft parameter are not within a predetermined threshold of each other, then the particular probe system is identified as having a malfunctioning member probe. Further, the malfunctioning probe can be directly identified as the probe which is a member probe in each of two separate systems each identified as having a malfunctioning member probe in step 570.

An additional example of the invention is shown in FIG. 8A. In this case, four locations of a MFP (MFPs 802, 804, 806 and 808) are shown in a front view. In this case, each of the four probes is equipped such that there are two independent measures of local static pressure. These are represented in FIG. 8A as static pressure measures 810 and 812 for MFP 802, static pressure measures 814 and 816 for MFP 804, static pressure measures 818 and 820 for MFP 806 and static pressure measures 822 and 824 for MFP 808. In this case, there are also four values of the local AOA and four independent measures of total pressure (one per system represented by the lines between static pressure measures).

Typical freestream static pressure is found using values of local pressure from opposite sides of the aircraft. When all four systems (using eight independent readings of local static pressure—two per MFP in the embodiment shown in FIG. 8A) are available, it is useful to compare the values from each independent system to isolate any that may be in error for whatever reason. In a fully functional set of four probes, it should be noted that four independent values of local AOA are available. The averaging across left and right provides a method for correcting for sideslip and in general, the averaged value must still be corrected for aircraft AOA and aircraft Mach number. One method of course fault isolation is shown in FIGS. 8B and 9.

As shown in blocks 840 and 842 in FIG. 8B, pressure inputs from a single MFP are used to generate local AOA and local static pressure calculations. Then, using local AOA and local static pressure from a symmetrically mounted MFP (844) (averaging for example), the aircraft static pressure is calculated. This is shown in block 846. In a four probe/four system configuration, three additional estimations of aircraft static pressure are obtained in the same manner as represented at block 848. At step 850, the four aircraft static pressure estimates are compared to determine whether they are equivalent within some determined tolerance. As shown at block 852, if the four aircraft static pressure estimations are within the determined tolerance, all systems are functioning properly. However, if they are not within tolerance of each other, fault isolation logic is used to determine which system or probe is malfunctioning.

FIG. 9 is a diagrammatic illustration of one method of comparing the four static pressures as discussed above. Each of the four system level Ps estimations ($Ps_A$, $Ps_B$, $Ps_C$ and $Ps_D$) are compared as being similar to the others. Depending on the airspeed, a tolerance is set such that the difference, $\epsilon$, between any two estimates of static pressure should be compared. Taking the four differences shown above ($\epsilon_{AD}$, $\epsilon_{BA}$, $\epsilon_{CB}$, and $\epsilon_{DC}$), to isolate one system that is in disagreement with the others, one would find that the absolute value of the difference between any system estimates will be beyond the tolerance if there is a common 'system' that is between them. For example, if system A were in disagreement with the others, $\epsilon_{BA}$ and $\epsilon_{AD}$ would be larger than the tolerance. The threshold must account for random error that is present in any of the systems. In this way, system A could be isolated as non-compliant and the data removed from consideration. This method of 'voting' is known in the art and can take on other embodiments.

FIG. 10A shows how one system has been identified as being poor (using darkened circles). It is the system between static pressure measure 810 of probe 802 and static pressure measure 820 of probe 806. With one bad system as shown, there are still three measures of local AOA and three independent measures of beta (sideslip) compensated static pressure. The logic presented in FIG. 9 can be extended to find the next system that is in error. At this point, it may not be known which transducer or probe is the problem, but it is now known that a particular system must not be used because it is in disagreement with the others.

We next consider the case where two of the original four systems have been lost. There are three choices—i.e. any of the three remaining systems in FIG. 10A could go down next. FIG. 10B illustrates one possibility in which the system between static pressure measure 812 of MFP 802 and the static pressure measure 818 of MFP 806 has been determined to be not operating properly. With only two remaining systems, an alternative for fault isolation is needed since one cannot vote one against the other. It is also possible that a single probe could get wiped out and take down two systems with it, e.g. in a bird strike situation, thus leaving only two functioning systems.

In FIG. 10B, there exists two independent RVSM accurate systems. In some embodiments of the invention, the method of sideslip correction is done as before. From each of the remaining two systems, there is an estimate made of the aircraft value of AOS based on the two local pressure ratio values used in each system (only a single source of Pt is needed as Pt is assumed to be constant outside the boundary layer). It should be noted that the AC AOA value could be used as a comparison and the use of AC AOS in the following implies both AC AOS and AC AOA. The aircraft AOS predicted by each of the two systems may come from an iterative process as defined before. If the two predictions for aircraft AOS differ by more than a specified tolerance, then one must go to another level to determine which of the two remaining systems is in error and which of the two remaining systems is correct.

To determine this, another estimate of AC AOS is made based on a series look-up table of AC AOS and AC AOA as a function of a single local static pressure ratio, Psl/qcl and the local AOA that corresponds to that particular system. Again, the iterative method may be used to converge on values of AC AOS and AC AOA. For the same system, this second estimate of AC AOS or AOA is compared to the first estimate of AC AOS or AOA determined from the two local static pressure ratios in that system. For a completely functional system, the first estimate of AC AOS (from the local static pressures) will be in agreement with the second estimate of AC AOS (from a single local static pressure and the corresponding AOA). If these two estimates of AC AOS differ by more than a specified tolerance, that data is invalidated and there remains a single, RVSM compliant system.

Finally, we consider the case of two probes failing on the same side. For example, probes 806 and 808 as shown in FIG. 11A. The methodology presented above can be used to provide two independent systems assuming that the appropriate signals are unique and sensitive to the various aircraft level parameters. The first system now becomes one of utilizing the local static pressure at one probe to compensate the local static pressure at a second probe and using the local AOA at the second probe to provide further correction. For example, the first of the remaining systems uses the local static pressure information at probe 802 at location 810 in conjunction with the local AOA as measured at probe 804 and the local static pressure at probe 804 as measured at 816. The second remaining system uses the local AOA at probe 802, and the local static pressure from 802 at 812 and the local static pressure at 814 on probe 804. Total pressure measurements at the probes are used as appropriate to provide the pressure ratios, Psl/qcl where Psl is the local static pressure and qcl is the local impact pressure defined as the difference between the total pressure and the local static pressure.

When the predicted value of aircraft static pressure, Ps, does not agree to within a tolerance between the two systems, the method of fault isolation in the invention must be invoked.

As before, several alternative estimates of the aircraft AOA and AOS must be made. For each of the remaining functioning systems, the first estimate is made via an iterative method (or other method known in the art) that isolates both aircraft level values of AOA and AOS based on a combination of local AOA at one probe and the local static pressure ratio, Psl/qcl at the other. In the second estimate of AC AOA and AC AOS, the iterative method may be used again to determine these values as a function of the pressure ratios Psl/qcl at each remaining probe.

Once the two predictions of AC AOA or AC AOS are known, they can be compared as before. If the two predictions for the AC AOS or AC AOA agree well (to within a tolerance) for a single system, it is determined that the system in question is functioning correctly. If the two predictions for either of the aircraft level values (AOA or AOS) do not agree, then the poorly performing system has been identified.

Although the present invention has been described with reference to illustrative embodiments, workers skilled in the art will recognize that changes may be made in form and detail without departing from the spirit and scope of the invention.

What is claimed is:

1. A method of detecting errors in air data sensing systems having a plurality of multi-function probes, the plurality of multi-function probes being used in combinations to define a plurality of probe systems each having at least two of the plurality of multi-function probes as members, the method comprising:

(A) for each of the plurality of probe systems, making a first prediction of a first aircraft parameter as a function of local angles of attack at the at least two member probes of the particular system, and making a second prediction of the first aircraft parameter as a function of local pressure ratios at the at least two member probes of the particular system;

(B) for each of the plurality of probe systems, comparing the first and second predictions of the first aircraft parameter to determine whether the first and second predictions are within a predetermined threshold of each other; and (C) for each of the plurality of probe systems, if the first and second predictions of the first aircraft parameter are not within a predetermined threshold of each other, then identifying the particular probe system as having a malfunctioning member probe.

2. The method of claim 1, wherein if in step (C) two of the plurality of probe systems are found to have a malfunctioning member probe, then further comprising step (D) of identifying as a malfunctioning probe a probe which is a member probe in each of the two probe systems found to have a malfunctioning member probe.

3. The method of claim 1, wherein in step (A) for each of the plurality of probe systems, making the second prediction of the first aircraft parameter as a function of local pressure ratios at the at least two member probes of the particular system further comprises making the second prediction of the first aircraft parameter as a function of the pressure ratio Psl/qcl at each of the at least two member probes, wherein Psl is local static pressure and qcl is local impact pressure.

4. The method of claim 1, wherein in step (A) for each of the plurality of probe systems, making the second prediction of the first aircraft parameter further comprises making the second prediction of the first aircraft parameter also as a function of a value of a second aircraft parameter.

5. The method of claim 4, wherein in step (A) for each of the plurality of probe systems, making the second prediction of the first aircraft parameter further comprises making the second prediction of the first aircraft parameter using an iterative method.

6. The method of claim 4, wherein the first aircraft parameter and the second aircraft parameter are respectively an aircraft angle of attack and an aircraft angle of sideslip.

7. The method of claim 4, wherein the first aircraft parameter and the second aircraft parameter are respectively an aircraft angle of sideslip and an aircraft angle of attack.

8. The method of claim 4, wherein the first aircraft parameter is one of an aircraft angle of attack and an aircraft angle of sideslip, and wherein the second aircraft parameter is an aircraft Mach number.

9. A multi-function probe configured to implement the method of claim 1.

* * * * *